(12) United States Patent
Yamagiwa et al.

(10) Patent No.: US 6,765,482 B2
(45) Date of Patent: Jul. 20, 2004

(54) AIR PRESSURE SENSOR FITTING STRUCTURE FOR VEHICLE WHEEL

(75) Inventors: Toshio Yamagiwa, Saitama (JP); Tomoyuki Harada, Saitama (JP); Akio Kawano, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/053,580

(22) Filed: Jan. 24, 2002

(65) Prior Publication Data

US 2002/0097148 A1 Jul. 25, 2002

(30) Foreign Application Priority Data

Jan. 24, 2001 (JP) .................................. 2001-016387

(51) Int. Cl.[7] .............................................. B60C 23/00
(52) U.S. Cl. ........................ 340/442; 73/146.5; 340/445
(58) Field of Search ................................ 340/442, 445, 340/447; 73/146.3, 146.4, 146.5, 146.8; 116/34 R, 34 A; 137/224, 227, 557; 152/416

(56) References Cited

U.S. PATENT DOCUMENTS

| | | | | |
|---|---|---|---|---|
| 5,604,481 A | * | 2/1997 | Lin ............................ | 340/442 |
| 6,034,596 A | * | 3/2000 | Smith et al. ................ | 340/447 |
| 6,101,870 A | * | 8/2000 | Kato et al. .................. | 73/146.8 |
| 6,167,900 B1 | * | 1/2001 | Laird .......................... | 137/227 |
| 6,194,998 B1 | * | 2/2001 | Huang ........................ | 340/442 |
| 6,300,867 B1 | * | 10/2001 | Rea et al. ................... | 340/442 |
| 6,351,990 B1 | * | 3/2002 | McInnes .................... | 73/146.8 |
| 6,357,469 B1 | * | 3/2002 | Bell ............................ | 137/224 |

FOREIGN PATENT DOCUMENTS

JP          10-44726          2/1998

* cited by examiner

Primary Examiner—Brent A. Swarthout
(74) Attorney, Agent, or Firm—Birch, Stewart, Kolasch & Birch, LLP

(57) ABSTRACT

An air pressure sensor fitting structure is provided for a vehicle wheel for fitting an air pressure sensor for detecting the air pressure of a tube of a vehicle wheel. The tube is provided with a pipe-shaped air valve and a tire covering the tube in the condition where the tube is fitted along a rim of a wheel. The air valve penetrates through the rim. A through-hole penetrating through a pipe of the air pressure valve is provided at a portion of the air pressure valve projecting from the rim. The air pressure sensor is fitted to the air pressure valve so as to cover the through-hole. The air pressure sensor can be fitted to a tubeless tire and a tubed tire while using the same structure.

17 Claims, 6 Drawing Sheets

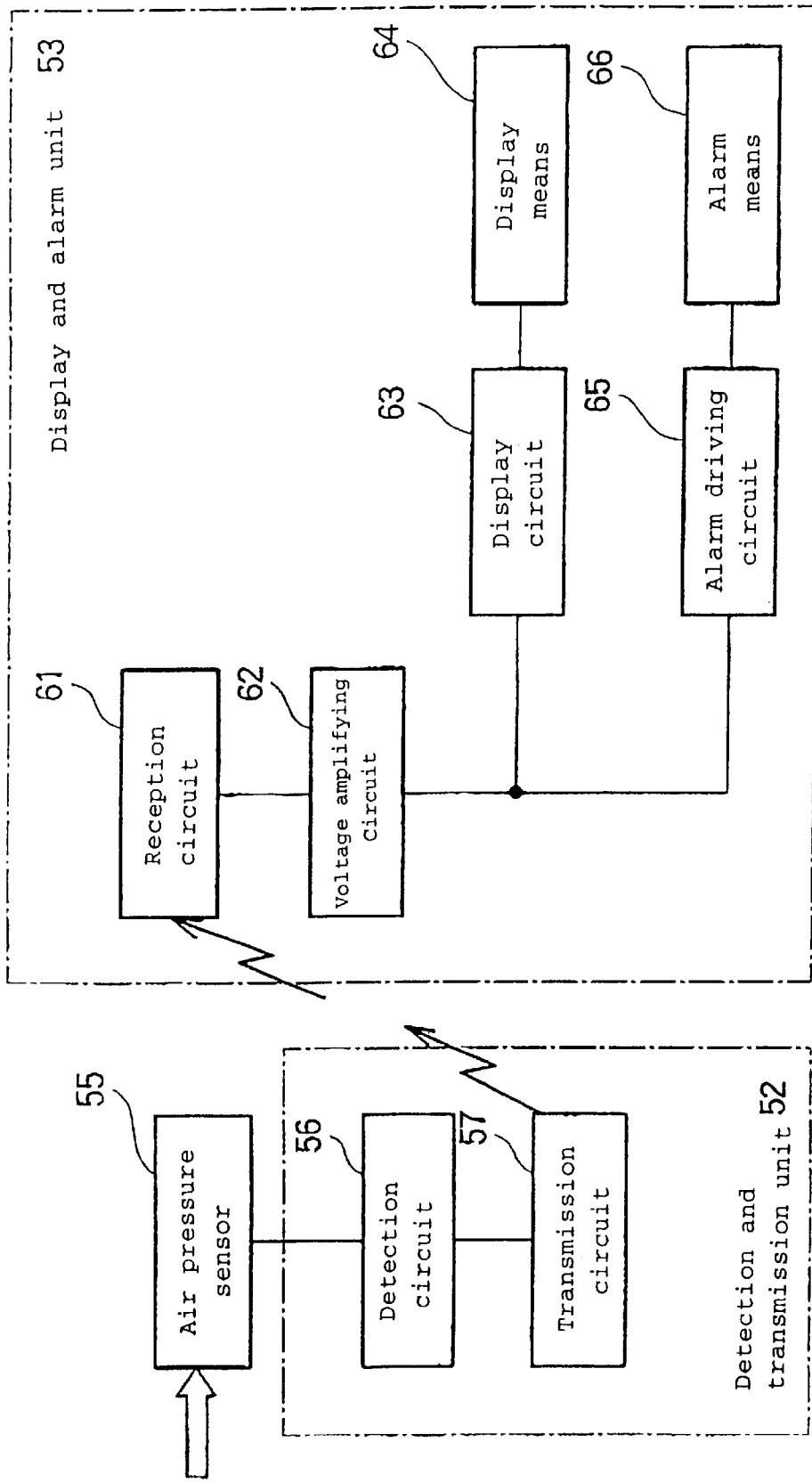

AIR PRESSURE SENSOR FITTING STRUCTURE FOR VEHICLE WHEEL

BACKGROUND OF THE INVENTION

CROSS-REFERENCE TO RELATED APPLICATIONS

The present application claims priority under 35 USC 119 of Japanese Patent Application No. 2001-016387 filed on Jan. 24, 2001, the entire contents thereof are hereby incorporated by reference.

1. Field of the Invention

The present invention relates to an air pressure sensor fitting structure used for an air pressure detection device for vehicle wheel which detects the air pressure of a tire and enables the driver to recognize the air pressure of the tire even during running of the vehicle.

2. Description of Background Art

An air pressure sensor fitting structure for use in an air pressure detection device for vehicle wheel, is known, for example, as disclosed in Japanese Patent Laid-Open No. Hei 10-44726, "Tire Air Pressure Alarm Device."

According to FIG. 1 of Japanese Patent Laid-Open No. Hei 10-44726, a tire air pressure alarm device is disclosed in which a valve stem 10 (symbols used in the publication are used here) is fitted to a wheel rim 1, a case 2 is disposed at a lower portion of the valve stem 10, and a transmission unit 7 which includes a pressure detecting portion 3, a signal processing circuit 4 and an electric cell 5 is contained in the case 2.

However, in the tire air pressure alarm device mentioned above, the transmission unit 7 including the pressure detecting portion 3 (hereinafter referred to as "air pressure sensor"), the signal processing circuit 4 and the electric cell 5 is contained in the case 2, so that many portions project from the lower portion of the valve stem 10, leading to damage to the dynamic balance of the tire.

In addition, although the structure is suitable for mounting on a tubeless tire, the structure is unsuitable for mounting on a tubed tire. Namely, in order to use the above tire air pressure alarm device for a tubed tire, the air pressure sensor must be fitted to the tire tube. However, the air pressure sensor cannot be fitted directly to the tire tube.

SUMMARY AND OBJECTS OF THE INVENTION

Accordingly, it is an object of the present invention to provide an air pressure sensor fitting structure for a vehicle wheel which can be mounted also on a tubed tire.

In order to attain the above object, an air pressure sensor fitting structure is provided for a vehicle wheel for fitting an air pressure sensor for detecting the air pressure of a tube to a vehicle wheel comprising the tube provided with a pipe-shaped air valve. A tire covering the tube is provided in the condition where the tube is fitted along a rim of a wheel and the air valve penetrates through the rim. A through-hole penetrating through a pipe of the air pressure valve is provided at a portion of the air pressure valve projecting from the rim, and the air pressure sensor is fitted to the air pressure valve so as to cover the through-hole.

To detect the tire pressure and make it possible to know the tire pressure even during operation of the vehicle provides effective driving information. Thus, an air pressure sensor for detecting the air pressure of a tube is fitted to a vehicle wheel including a tube provided with a pipe-shaped air valve and a tire covering the tube in the condition where the tube is fitted along a rim of a wheel and the air valve penetrates through the rim. A through-hole penetrating through a pipe of the air pressure valve is provided at a portion of the air pressure valve projecting from the rim, and the air pressure sensor is fitted to the air pressure valve so as to cover the through-hole.

For example, in the case of a tubeless tire, the air pressure sensor can be fitted directly to the rim of the tire or the like. However, in the case of a tubed tire, the air pressure sensor cannot be fitted directly to the tube. In view of this, a through-hole penetrating through a pipe of the air pressure valve is provided at a portion of the air pressure valve projected from the rim, and the air pressure sensor is fitted to the air pressure valve so as to cover the through-hole, whereby the air pressure sensor can be fitted to the tubeless tire and to the tubed tire while using the same structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a block diagram of the air pressure detection device for vehicle wheel according to the present invention.

DETAILED DESCRIPTION OF THE PREFERRED EMBODIMENTS

An embodiment of the present invention will be described below based on the attached drawings. The terms "front", "rear", "left", "right", "upper" and "lower" conform to the directions as viewed from the driver, and Fr means the front side, Rr means the rear side, L means the left side, and R means the right side.

Figure 1:
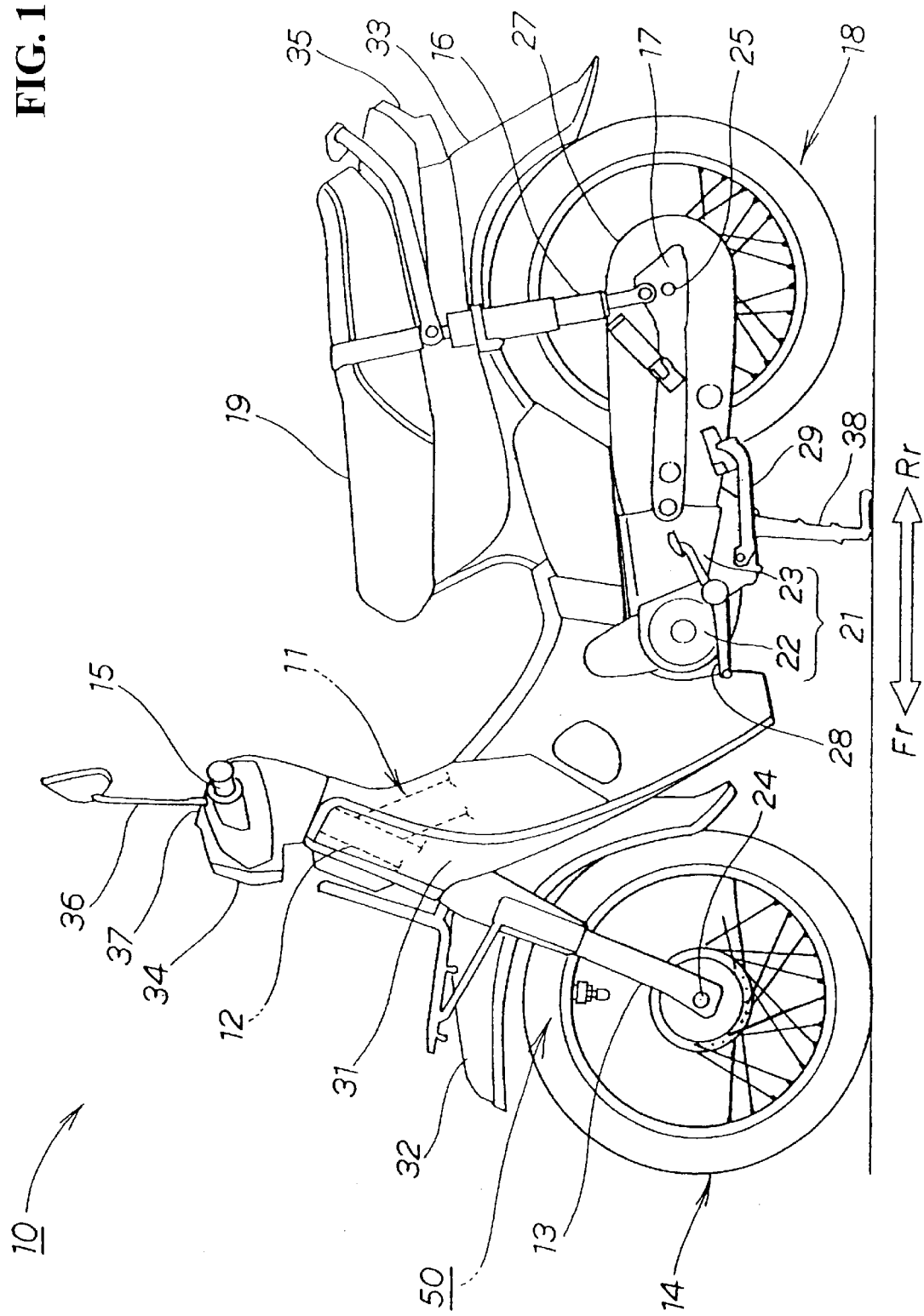
FIG. 1 is a side view of a motorcycle on which an air pressure detection device for a vehicle wheel according to the present invention is mounted.

FIG. 1 is a side view of a motorcycle on which an air pressure detection device for a vehicle wheel according to the present invention is mounted. The motorcycle 10 includes a vehicle body frame 11 extending toward a rear lower portion of the vehicle body. A head pipe 12 is fitted to the vehicle body frame 11. A front fork 13 is fitted to the head pipe 12 with a front vehicle wheel 14 fitted to the front fork 13. A handle 15 is connected to the front fork 13. A rear suspension 16 includes one end fitted to a rear upper portion of the vehicle body frame 11. A swing arm 17 is swingably fitted between the other end of the rear suspension 16 and a rear lower portion of the vehicle body frame 11. A rear vehicle wheel 18 is fitted to the tip end of the swing arm 17. A seat 19 is disposed at a rear upper portion of the vehicle body frame 11 with a power unit 21 including an engine 22 and a speed change gear 23 disposed on the lower side of the vehicle body frame 11.

As illustrated in FIG. 1, axles 24 and 25, a drive chain cover 27, a brake pedal 28, a kick pedal 29, a leg shield 31, a front fender 32, a rear fender 33, a head lamp 34, a tail lamp 35, a rear view mirror 36, a meter panel 37, and a stand 38 are operatively mounted relative to the vehicle body frame 11.

An air pressure detection device 50 is provided for a vehicle wheel (hereinafter referred to simply as "air pressure detection device 50") which, as described later, is a device for detecting the air pressure of a tire and enabling the driver to recognize the air pressure of the tire even during operation of the vehicle, and adopts the air pressure sensor fitting structure according to the present invention.

Figure 2:
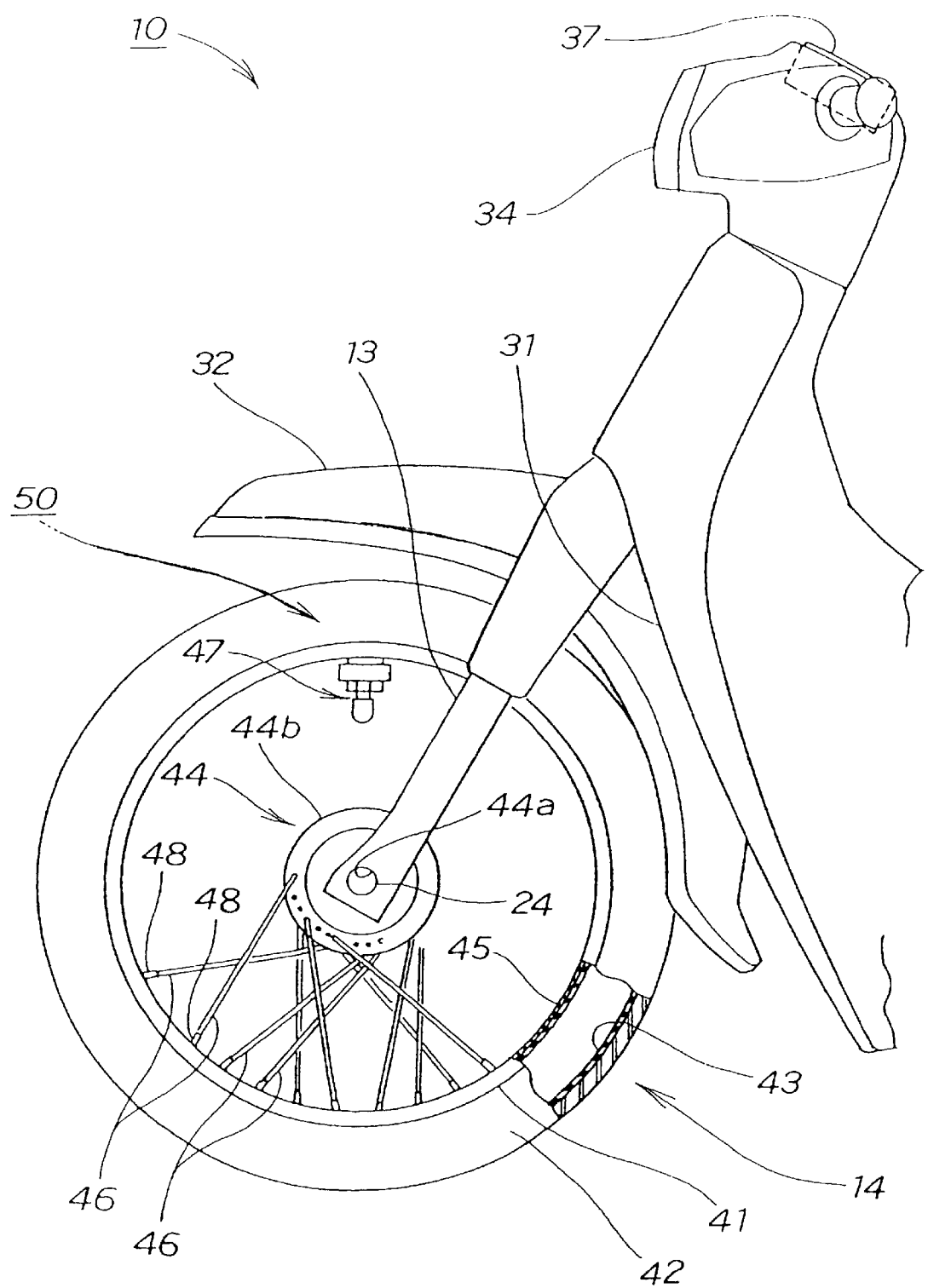
FIG. 2 is a side view of a front portion of the motorcycle on which the air pressure detection device for a vehicle wheel according to the present invention is mounted.

FIG. 2 is a side view of a front portion of the motorcycle on which the air pressure detection device for a vehicle wheel according to the present invention is mounted.

The vehicle wheel 14 comprises a disk-form wheel 41, a tire 42 fitted to the wheel 41, and a tire tube 43 contained between the wheel 41 and the tire 42, and is provided with the air pressure detection device 50 intermediately disposed between the tire tube 43 and the wheel 41.

Figure 3:
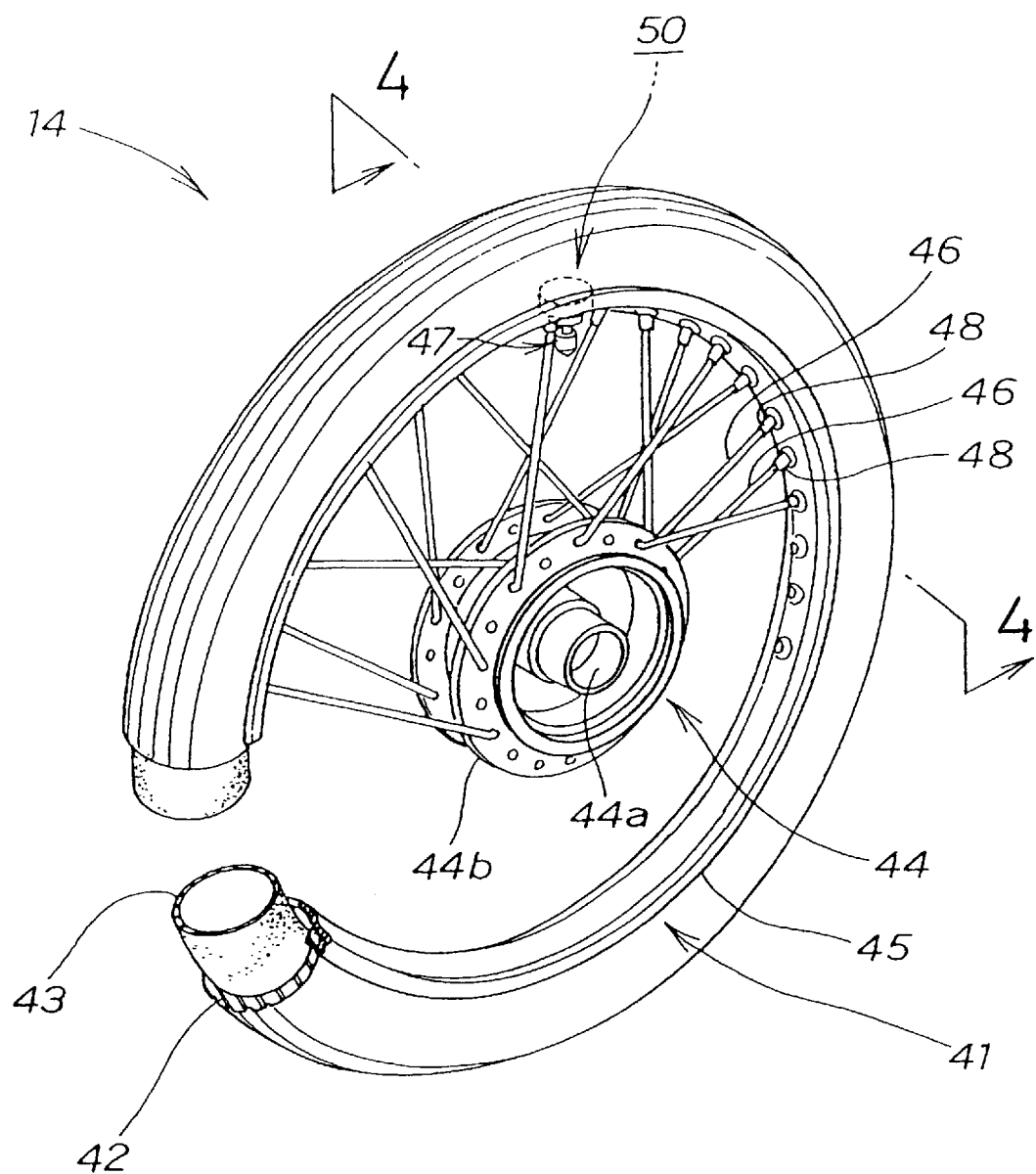
FIG. 3 is a perspective view of a vehicle wheel on which the air pressure detection device for a vehicle wheel according to the present invention is mounted.

FIG. 3 is a perspective view of the vehicle wheel on which the air pressure detection device for a vehicle wheel according to the present invention is mounted. The wheel 41 comprises a hub 44 rotatably fitted to the axle 24, a rim 45 on which to fit the tire 42, and a plurality of spokes 46 . . . ( . . . means plurality, here and hereinafter) connecting the rim 45 and the hub 44.

The hub 44 includes a bearing portion 44a fitted to the axle 24 through a bearing (not shown), and disk portions 44b . . . for hooking the plurality of spokes 46 . . . The rim 45 is provided with an air valve 47 for injecting air into the tire 42.

The spoke 46 has one end hooked on the disk portion 44b of the hub 44, and the other end fitted to the rim 45 through a nipple 48, whereby the rim 45 and the hub 44 are integrally connected.

The rear vehicle wheel 18 has substantially the same constitution as that of the vehicle wheel of the front vehicle wheel 14, and detailed description thereof is omitted.

Figure 4:
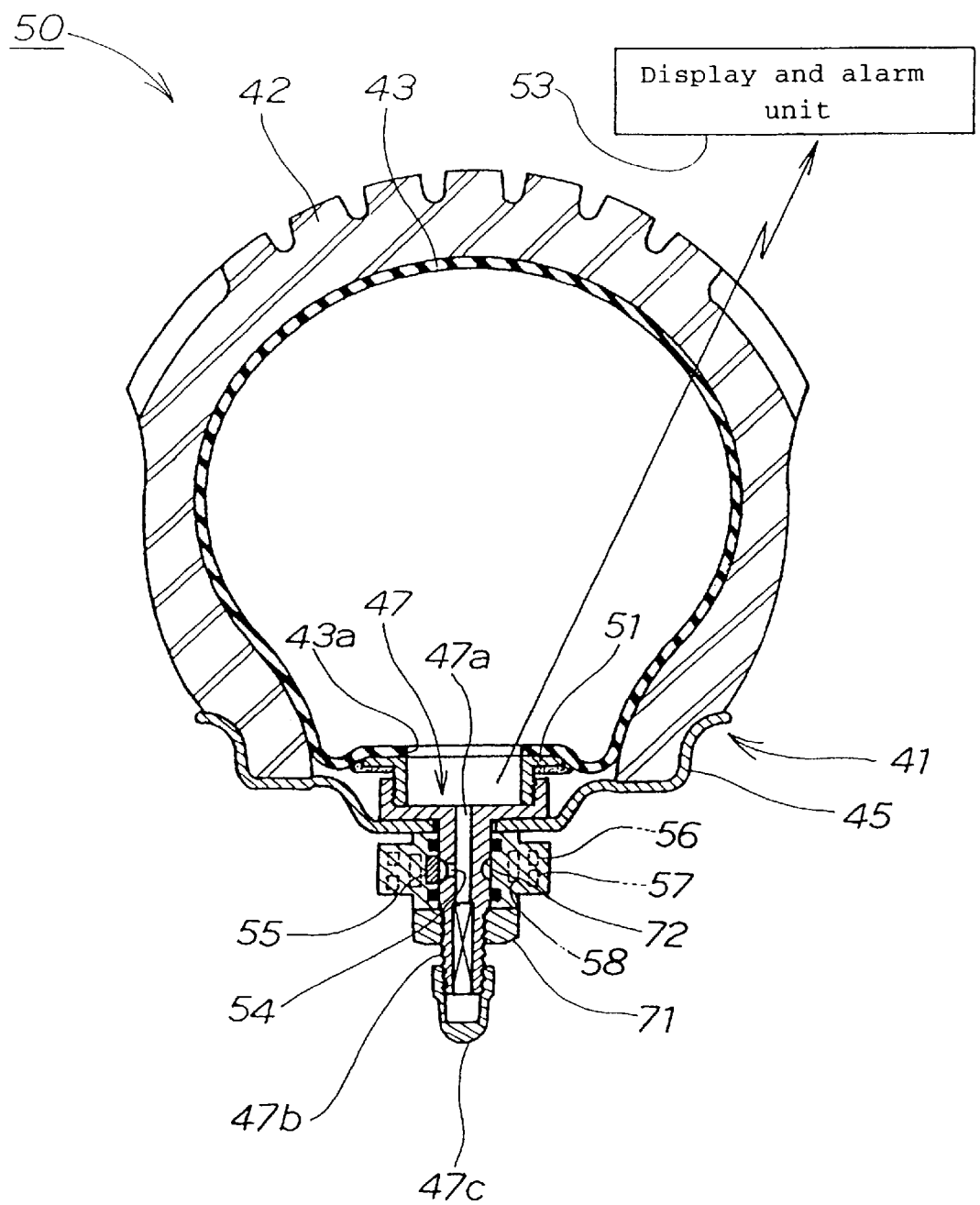
FIG. 4 is a sectional view taken along line 4-4 of FIG. 3.

FIG. 4 is a sectional view taken along line 4-4 of FIG. 3, illustrating a front section of the air pressure detection device 50.

Figure 5:
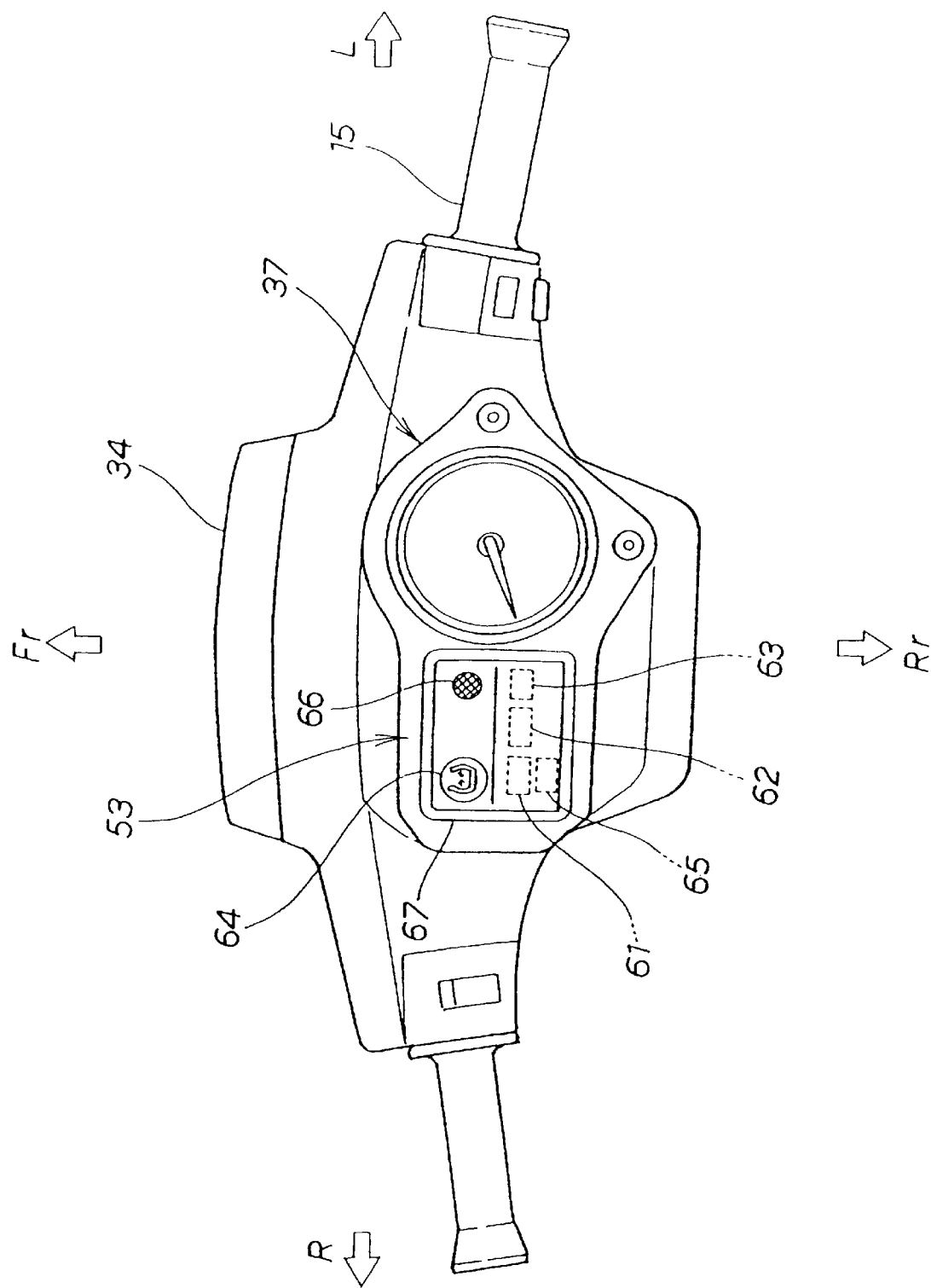
FIG. 5 is a plan view of a display and alarm unit of the air pressure detection device for a vehicle wheel according to the present invention.

As illustrated in FIGS. 4 and 5, the air pressure detection device 50 is connected to the tire tube 43 that is provided with an opening portion 43a and an annular seat portion 51 fitted to the opening portion 43a. An air valve 47 is fitted to the seat portion 51. A pipe 47a of the air valve 47 is provided with a through-hole. An air pressure sensor 55 for detecting the air pressure is provided for covering the through-hole. A detection and transmission unit 52 is provided as a detection and transmission circuit for detecting the pressure information from the air pressure sensor 55, transforming the detected pressure information into an electrical signal, and emitting the electrical signal through as an electromagnetic wave. A display and alarm unit 53 is provided for receiving the pressure information from the detection and transmission unit 52 and issuing a display or alarm.

The display and alarm unit 53, as described later, is a unit provided at the meter panel 37 (See FIG. 2). In addition, a portion 47b of the air pressure valve 47 projects from the rim 45. A cap 47c is detachably fitted to the air pressure valve 47. A nut 71 is provided for fixing the detection and transmission unit 52 to the air pressure valve 47. A semicircular groove 72 is provided at the portion of the air pressure valve 47 that projects from the rim 45. The air pressure sensor 55 is fitted freely with respect to the radial direction of the air pressure valve 47.

With the air pressure valve 47 provided with the semicircular groove 72, the air pressure inside the tube 43 can be accurately detected even if the through-hole 54 and the air pressure sensor 55 are not adjacent to each other. Therefore, the air pressure detection device 50 can be fitted freely with respect to the radial direction of the air pressure valve 47. As a result, the workability of fitting the air pressure detection device 50 can be enhanced.

The detection and transmission unit 52 includes a detection circuit 56 connected to the air pressure sensor 55 so as thereby to pick up the pressure information as an electrical signal. A transmission circuit 57 is provided for emitting the electrical signal of the detection circuit 56 through electromagnetic waves. An electric cell 58 is provided for driving the detection circuit 56 and the transmission circuit 57. A case 59 is provided for collectively containing the detection circuit 56, the transmission circuit 57 and the electric cell 58.

The air pressure sensor fitting structure for a vehicle wheel according to the present invention is an air pressure sensor fitting structure for the vehicle wheel for fitting the air pressure sensor 55 for detecting the air pressure of the tube 43 to the vehicle wheel 14 including the tube 43 provided with the pipe-shaped air valve 47 and the tire 42 covering the tube 43 in the condition where the tube 43 is fitted along the rim 45 of the wheel 41 and the air valve 47 penetrates through the rim 45. The through-hole 54 penetrating through the pipe 47a of the air pressure valve 47 is provided at the portion 47a of the air pressure valve 47 projecting from the rim 45. The air pressure sensor 55 is fitted to the air pressure valve 47 for covering the through-hole 45.

To detect the tire pressure and make it possible to know the tire pressure during operation of the vehicle provides effective driving information. In view of this, the air pressure sensor 55 for detecting the air pressure of the tube 43 is fitted to the vehicle wheel 14 including the tube 43 provided with the pipe-shaped air valve 47 and the tire 42 covering the tube 43 in a condition where the tube 43 is fitted along the rim 45 of the wheel 41 and the air valve 47 penetrates through the rim 45. The through-hole 48 penetrating through the pipe 47a of the air pressure valve 47 is provided at the portion 47b of the air pressure valve 47 projecting from the rim 45. The air pressure sensor 55 is fitted to the air pressure valve 47 so as to cover the through-hole 48.

For example, in the case of a tubeless tire (not shown), the air pressure sensor 55 can be fitted directly to the rim of the wheel or the like. However, in the case of a tubed tire, the air pressure sensor 55 cannot be fitted directly to the tube 43.

In view of this, the through-hole 54 penetrating through the pipe 47a of the air pressure valve 47 is provided at the portion 47b of the air pressure valve 47 projecting from the rim 45. The air pressure sensor 55 is fitted to the air pressure valve 47 for covering the through-hole 54, whereby the air pressure sensor 55 can be fitted to the tubeless tire and to the tubed tire while using the same structure.

The air pressure sensor fitting structure according to the present invention can be universally used for tires of any type, making it possible to contrive an enhancement of the degree of freedom in designing.

FIG. 5 is a plan view of a display and alarm unit of the air pressure detection device for a vehicle wheel according to the present invention illustrating the plane surface of the meter panel 37 fitted to the handle 15.

The display and alarm unit 53, which is provided at the meter panel 37, includes a reception circuit 61 for receiving the electromagnetic wave emitted from the detection and transmission unit 52 shown in FIG. 3. A voltage amplifying circuit 62 is provided for amplifying a signal received by the reception circuit 6. A display circuit 63 is provided for displaying a tire pressure based on a voltage value amplified by the voltage amplifying circuit 62. A display means 64 is driven by the display circuit 63. An alarm driving circuit 65 is operated when the voltage value amplified by the voltage amplifying circuit 62 is lower than a preset voltage value. An alarm means 66 is driven by the alarm driving circuit 65. A housing 67 is provided for collectively containing the reception circuit 61, the voltage amplifying circuit 62, the display circuit 63, the display means 64, the alarm driving circuit 65 and the alarm means 66.

The action or effect of the air pressure detection device 50 described above will be described below. FIG. 6 is a block diagram of the air pressure detection device for a vehicle wheel according to the present invention. The tire pressure is detected by the air pressure sensor 55, the pressure information is picked up as an electrical signal by a detection circuit 56, and the electrical signal is transmitted by a transmission circuit 57 to the side of a display and alarm unit 53.

The electromagnetic wave transmitted from the detection and transmission unit 52 is received by a reception circuit 61, the signal received by the reception circuit 61 is amplified by a voltage amplifying circuit 62, the amplified signal is transformed into a predetermined signal by a display circuit 63 so as to display the tire pressure based on the voltage value amplified by the voltage amplifying circuit 62, and the tire pressure is displayed by a display means 64.

When the voltage value amplified by the voltage amplifying circuit 62 is lower than a preset voltage value, an alarm driving circuit 65 is operated, whereby an insufficient tire pressure condition is informed of by an alarm means 66.

While the vehicle has been described as the motorcycle 10 as shown in FIG. 1 in the embodiment, the vehicle is not limited to a motorcycle, and may be a four-wheel or three-wheel vehicle.

While the display means 64 and the alarm means 66 have been provided at the meter panel 37 as shown in FIG. 4 in the embodiment, this is not limitative. For example, means issuing an alarm may be provided at the vehicle frame or a helmet or the like, and means utilizing vibration may be provided at the seat or a helmet or the like. While the display and alarm unit 53 has been described as a unit for the front vehicle wheel 14 (See FIG. 1), the unit also performs display and alarm actions for the rear vehicle wheel 18 (See FIG. 1).

Further, the air pressure sensor fitting structure for the vehicle wheel according to the present invention has been described referring to a tubed tire as shown in FIG. 4 in the embodiment, this is not limitative, and the air pressure sensor fitting structure may be used for a tubeless tire.

While the air pressure valve 47 is provided with the semicircular groove 72 and the air pressure sensor 55 is fitted freely with respect to the radial direction of the air pressure valve 47 as shown in FIG. 4 in the embodiment, this is not limitative, and the semicircular groove may be provided on the side of the air pressure detection device at the position of the air pressure sensor. Besides, the semicircular groove is not limited to a semicircular-formed groove, and may be a V-shaped groove, a U-shaped groove, a rectangular groove, a trapezoid-shaped groove or the like.

The present invention, constructed as described above, displays the following effects. An air pressure sensor fitting structure for a vehicle wheel for fitting an air pressure sensor for detecting the air pressure of a tube to a vehicle wheel includes the tube provided with a pipe-shaped air valve and a tire covering the tube in the condition where the tube is fitted along a rim of a wheel and the air valve penetrates through the rim, wherein a through-hole penetrating through a pipe of the air pressure valve is provided at a portion of the air pressure valve projecting from the rim, and the air pressure sensor is fitted to the air pressure valve so as to cover the through-hole.

For example, in the case of a tubeless tire, the air pressure sensor can be fitted directly to the rim of the wheel or the like. However, in the case of a tubed tire, the air pressure sensor cannot be fitted directly to the tube.

In view of this, the through-hole penetrating through the pipe of the air pressure valve is provided at a portion of the air pressure valve projecting from the rim, and the air pressure sensor is fitted to the air pressure valve so as to cover the through-hole, whereby the air pressure sensor can be fitted to the tubeless tire and to the tubed tire while using the same structure.

As a result, the air pressure sensor fitting structure according to the present invention can be universally used for tires of any type, and it is possible to contrive an enhancement of the degree of freedom in designing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air pressure sensor for a vehicle wheel for detecting the air pressure of a vehicle wheel comprising:

an air valve with a threaded cup-shaped base fitted directly on a tire side of a rim of the wheel for coupling with a threaded portion of a tire tube, a tire being mounted on the rim;

an air valve stem of the air valve penetrating through said rim; and a through-hole penetrating through a portion of said air valve stem that projects from said rim, and communicating with a semicircular goove extending around an outer surface of the air valve stem; and a detection and transmission unit fitted to said air valve stem for covering said through-hole and for sensing the pressure within said tire, wherein the transmission unit emits an electromagnetic signal to a display unit.

2. The air pressure sensor fitting structure for a vehicle wheel according to claim 1, wherein said detection and transmission unit includes a housing that is secured between a rim of a wheel and a threaded portion of said air valve stem.

3. The air pressure sensor fitting structure for a vehicle wheel according to claim 2, and further including a securing means mounted on said threaded portion of said air valve stem for securing said detection and transmission unit relative to said air valve stem.

4. The air pressure sensor fitting structure for a vehicle wheel according to claim 1, wherein said detection and transmission unit is capable of detecting the pressure within said tire regardless of a radial orientation of the detection and tramsission unit.

5. The air pressure sensor fitting structure for a vehicle wheel according to claim 2, and further including seals mounted relative to said housing for providing a air tight seal of said housing relative to said air valve stem.

6. The air pressure sensor fitting structure for a vehicle wheel according to claim 1, wherein said air valve stem includes an air valve and said detection and transmission unit is mounted in a radial direction relative to said air valve.

7. The air pressure sensor fitting structure for a vehicle wheel according to claim 1, wherein an annular seat portion of a tire tube is fitted into the cup-shape base of the air valve.

8. The air pressure sensor fitting structure for a vehicle wheel according to claim 2, and further including seals mounted in grooves of said housing for providing a air tight seal of said housing relative to said air valve stem.

9. The air pressure sensor fitting structure for a vehicle wheel according to claim 1, wherein the air valve stem penetrates through said rim from the tire side of said rim toward an axle of the wheel.

10. A device adapted for detecting the air pressure of a vehicle wheel comprising:
   an air valve with a threaded cup-shaped base fitted directly on a tire side of a rim of the wheel for coupling with a threaded portion of a tire tube;
   an air valve stem with a semicircular groove extending around an outer surface thereof;
   a through-hole penetrating through said air valve stem; and
   an air pressure sensor mounted on said air valve stem and being in communication with said through-hole via said groove for detecting the air pressure of a vehicle wheel.

11. The air pressure sensor fitting structure for a vehicle wheel according to claim 10, wherein said housing is secured to said air valve stem adjacent to a threaded portion of said air valve stem.

12. The air pressure sensor fitting structure for a vehicle wheel according to claim 11, and further including a securing means mounted on said threaded portion of said air valve stem for securing said air pressure sensor relative to said air valve stem.

13. The air pressure sensor fitting structure for a vehicle wheel according to claim 10, wherein said air pressure sensor is capable of detecting the pressure within said tire regardless of a radial orientation of the housing of the air pressure sensor.

14. The air pressure sensor fitting structure for a vehicle wheel according to claim 11, and further including seals mounted relative to said housing for providing a air tight seal of said housing relative to said air valve stem.

15. The air pressure sensor fitting structure for a vehicle wheel according to claim 10, wherein an annular seat portion of a tire tube is fitted into the cup-shape base of the air valve.

16. The air pressure sensor fitting structure for a vehicle wheel according to claim 11, and further including seals mounted in grooves of said housing for providing a air tight seal of said housing relative to said air valve stem.

17. The air pressure sensor fitting structure for a vehicle wheel according to claim 10, wherein the air valve stem penetrates through said rim from the tire side of said rim toward an axle of the wheel.

* * * * *